United States Patent [19]

Dorreboom

[11] 4,114,259

[45] Sep. 19, 1978

[54] METHOD OF MAKING A HIGH DENSITY MULTITRACK MAGNETIC HEAD

[75] Inventor: Jelmer Dorreboom, Olivenhain, Calif.

[73] Assignee: Spin Physics, Inc., San Diego, Calif.

[21] Appl. No.: 836,862

[22] Filed: Sep. 26, 1977

Related U.S. Application Data

[62] Division of Ser. No. 735,729, Oct. 26, 1976, Pat. No. 4,084,199.

[51] Int. Cl.[2] .......... G11B 5/42

[52] U.S. Cl. .......... 29/603; 29/418

[58] Field of Search .......... 29/603, 418, 423; 360/119–122, 125, 127

[56] References Cited

U.S. PATENT DOCUMENTS

| | | | |
|---|---|---|---|
| 3,400,386 | 9/1968 | Sinnott | 29/603 X |
| 3,761,641 | 9/1973 | Mlinaric | 29/603 X |
| 3,909,932 | 10/1975 | Kroon | 29/603 |
| 3,983,622 | 10/1976 | Schneider et al. | 29/603 |

*Primary Examiner*—Carl E. Hall
*Attorney, Agent, or Firm*—Robert F. Cody

[57] ABSTRACT

The front face of a multitrack magnetic head has a stack of track defining pole pairs and spacers between the pole pairs of adjacent tracks. The spacers are slotted, and shields reside in the slots. A chamfer runs longitudinally of the stack. Embracing opposite sides of the stack and parallel to the chamfer, are non-magnetic wing parts, such parts being part of a surround used in the manufacture of the front face. Bonding glass, in the form of a unitary "lattice" fills the chamfer, and the spacings between the ceramic and shields, and the wing parts and stack.

The method for forming the head employs a surround having a depth greater than the depth of the stack, thereby forming a basin for accepting the bonding glass.

4 Claims, 15 Drawing Figures

30a 34b 34a 33 36a 37 42 42 44 38a 39 38b 21a
21a
20a
20
21b
51
24
55
54
55a
55b
56

18
11a
16
12
14
11b
23
19
22
17
13
15
51

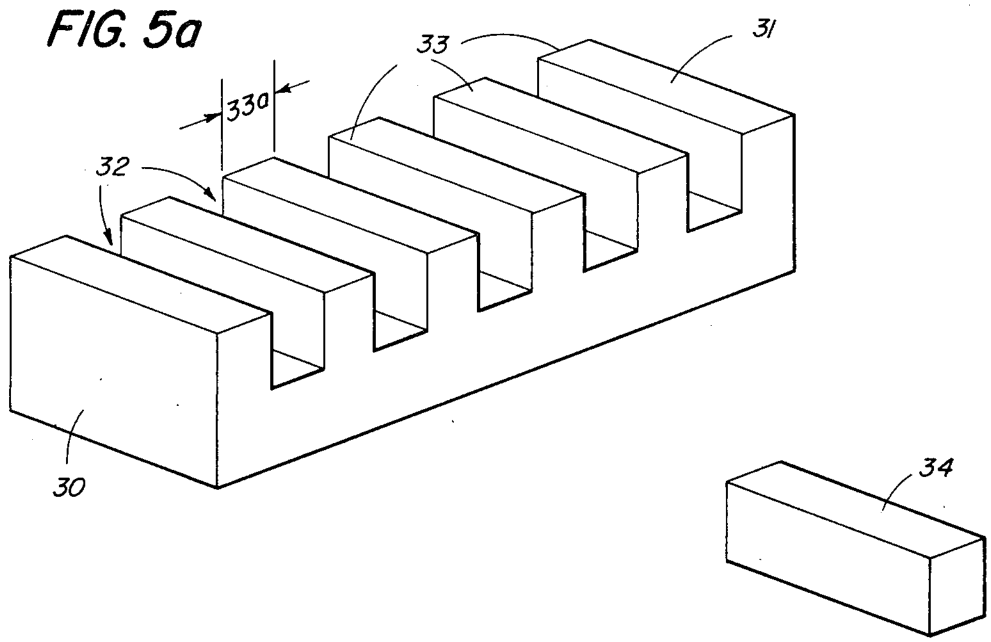
FIG. 5a
33
31
33a
32
30
34
FIG. 5b
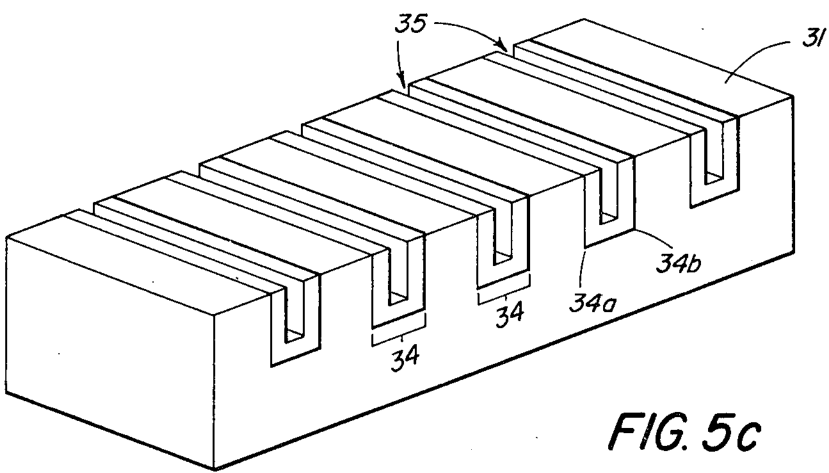
35
31
34b
34a
34
34
FIG. 5c FIG. 5d
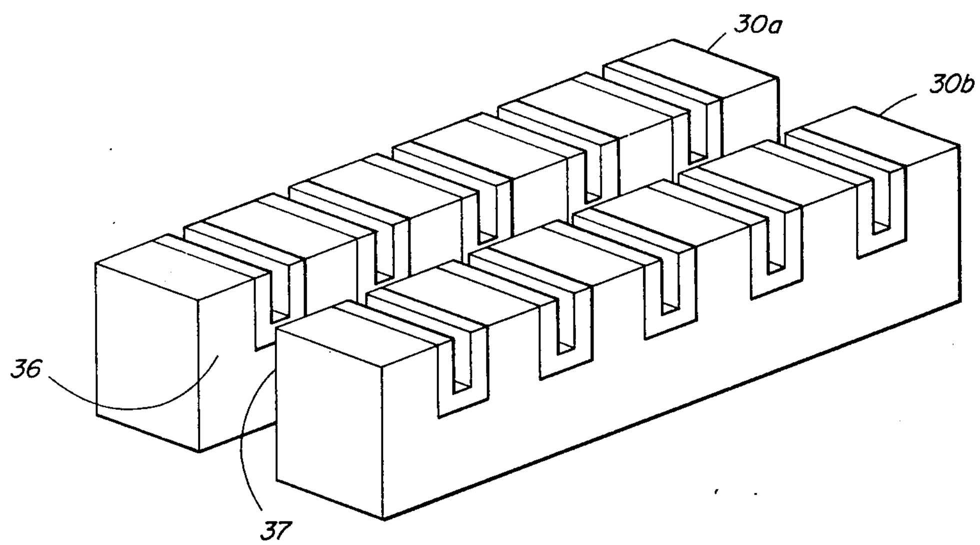
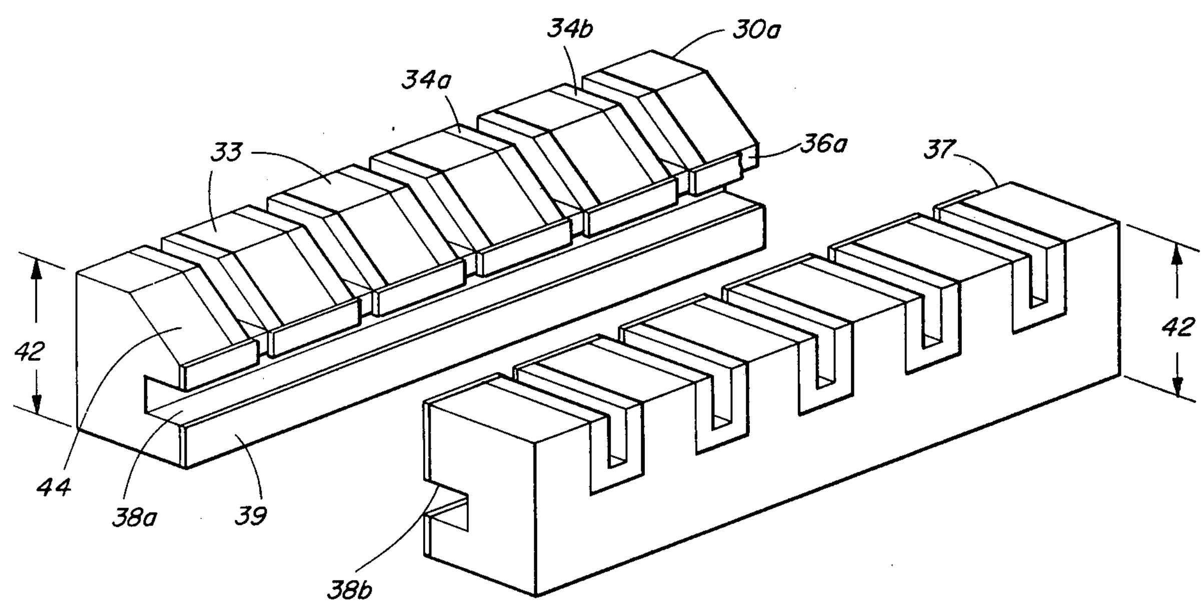
FIG. 5e 90
40a
40b
41

45
43
40a
40b
H
H
44
37
CUT LINE
CUT LINE

FIG. 5h
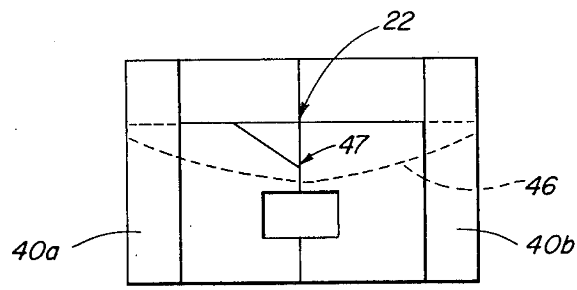
FIG. 5i
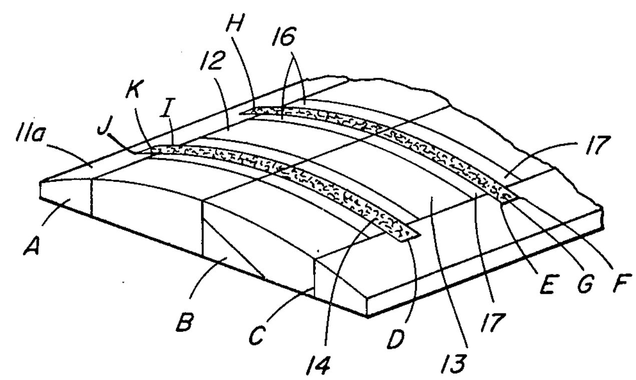
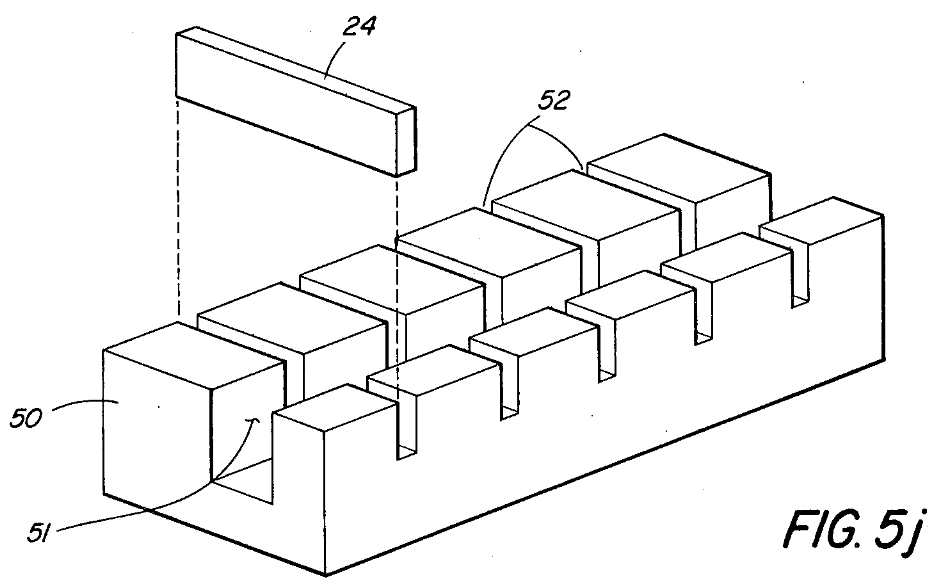
FIG. 5j

METHOD OF MAKING A HIGH DENSITY MULTITRACK MAGNETIC HEAD

This is a division of application Ser. No. 735,729, filed Oct. 26, 1976 now U.S. Pat. No. 4,084,199.

1. Field of the Invention

This invention relates in general to magnetic heads and methods for making magnetic heads.

2. Description Relative to the Prior Art

Track width dimensions, and precise track-to-track spacing, is a continuing matter of concern for manufacturers of multitrack ferrite record/play heads. These considerations, and overall structural integrity, for such heads are especially critical to manufacture of high track density heads, e.g., heads having as many as 21 tracks per inch.

SUMMARY OF THE INVENTION

The invention provides a high track-density front face for a multitrack magnetic head by use of a method in which thin fragile ferrite track defining pieces, resulting from the slotting of a ferrite block, are supported by ceramic spacers. The spacers are slotted, and thereafter the block is halved. One (or both) of the block halves is chamfered, and the two halves are then placed in a ceramic surround, with the chamfer(s) topside. The surround has a depth deeper than the depth of the ferrite block, thereby forming a basin within which bonding glass is placed. By melting the glass, a head front face is formed in which the parts of the front face are all bonded together by means of a unitary lattice of glass.

BRIEF DESCRIPTION OF THE DRAWINGS

The invention will be described with reference to the drawings, wherein:

FIGS. 5A through 5K illustrate the steps involved in the method of manufacturing a presently preferred embodiment of the head assembly.

DESCRIPTION OF THE PREFERRED EMBODIMENTS

Figure 3:
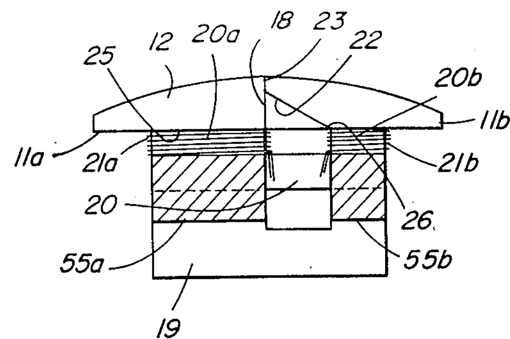
FIG. 3 is a section view of the head assembly of FIG. 1 taken along lines 3—3 thereof.
Figure 1:
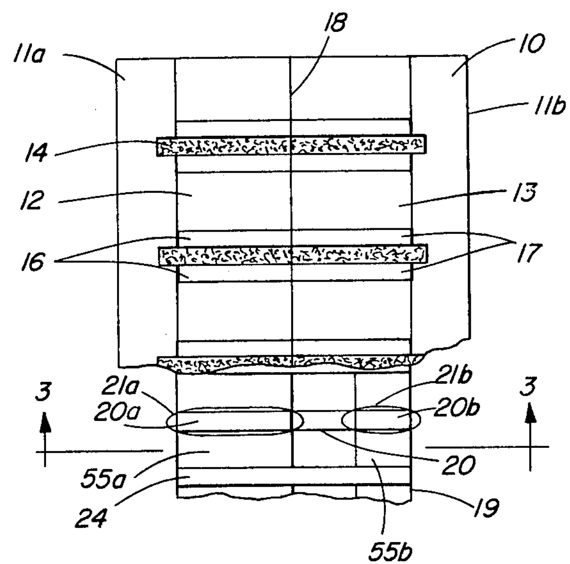
FIG. 1 is a front elevation view of the magnetic head partially cut away for clarity.
Figure 2:
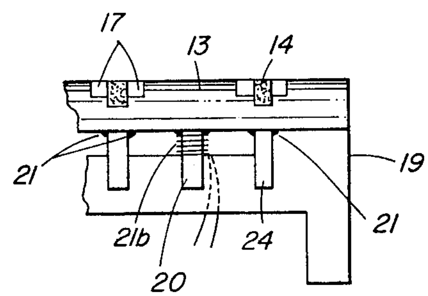
FIG. 2 is a side elevation view also partially cut away to display the internal components.

With reference to FIGS. 1–4, the magnetic head assembly of the present invention comprises part of a head face surround 10 of a ceramic material between which a plurality of separate pole pieces 12 and 13, shields 14 and spacers 16 and 17 are located. In accordance with the invention, each of the plurality of pole pieces 12 and 13, as well as the shields 14, are of a magnetic ferrite material. The spacers 16 and 17 may be of any suitable non-magnetic ceramic material; a ceramic-convertible glass such as FOTOCERAM (obtainable from Corning Glass) has been found useful for this purpose. Each of the plurality of spacers, pole pieces and shields are glass bonded to each other and to the surfaces of part 10 in contact therewith to form what shall be hereafter referred to as face 11. Face 11 is further formed in two half portions **11*a* and 11*b*, each carrying a half set of the pole pieces and spacers and a portion of the integral ferrite shield 14. In the completed head assembly, face portions 11*a* and 11*b* and the plurality of pole tips 12 and 13 and spacers 16 and 17 abut at a gap region 18 in which a layer of non-magnetic material is disposed to define the transducing gaps. Face surround 10 with the various pole pieces 12 and 13, spacers 16 and 17 and shields 14 mounted therein is fabricated as a unit and is thereupon mounted onto a back housing 19, preferably also of a ceramic material such as forsterite, carrying a plurality of magnetic core members 20, each provided with a pair of electrical coils 21*a* and 21*b*. Each core member 20 is arranged to engage associated pairs of pole pieces 12 and 13 of face 11 so as to complete a magnetic circuit in each case traversing the non-magnetic transducer gap at region 18. Thus separate branches 20*a* and 20*b* of each core member 20 are positioned so as to engage associated pole pieces 12 and 13 on opposite sides of the non-magnetic gap. In this manner, a plurality of transducers are formed, each comprising a pair of pole pieces carried in face 11 and a single integral core member mounted within back housing 19**.

In order to define the depth of the transducing gap when the head is finished, pole pieces 12 and 13 are provided with a wedge-shaped well or groove 22 extending parallel and beneath the gap region 18 with the wedge apex defining the bottom of a non-magnetic gap 23 between each pair of pole pieces. In order to support the extremely shallow gap 23, the wedge-shaped groove 22 is filled with glass in a bonding operation to be described more fully hereinafter. It is to be noted that wedge-shaped groove 22 is entirely defined within face portion **11*b* in the sense that one edge thereof is chamfered to provide the groove opening. A head according to this presently preferred core cross-section requires a smaller core structure in back housing 19 than a head which provides for chamfering the equivalent of both face portions 11*a* and 11*b*. This diminished structure reduces the path lengths of flux through the magnetic structure and thereby increases the magnetic efficiency of the core 20 — pole pieces 12–13 combination. Due to the presently preferred magnetic geometry, the face portions 11*a* and 11*b*** are non-symmetrical in cross-sectional form.

A plurality of "non-gapped" back shields 24 are provided in the back housing 19, each between an adjacent pair of core members 20. Referring now to FIG. 3, a planar surface 25 of face 11 is mounted on a corresponding planar surface 26 of back housing 19 such that the faces of pole pieces 12 and 13 flush with surface 25 engage surface portions of one of the core members 17 flush with surface 26 completing a magnetic circuit traversing the gap 23. The back shields 24 extend generally flush with the surface 26 of the back housing 19 and meet with and engage the shields 14 of the face part in a manner similar to the engagement of the pole tips and core members. In order to secure the face 11 to the back housing 19, an epoxy bond 21 is provided around the shields 24 at the rear of the cores 20.

In accordance with the method of the present invention illustrated in FIGS. 5A–5K, face 11 is initially formed from a rectangular block 30 of ferrite material in which a planar face 31 thereof is provided with a plurality of spaced, rectangular cross section slots 32. The block 30 is preferably of a hot pressed ferrite material that is suitable for use as pole tips. The slots 32 therefore define the individual ferrite abutments 33 and a precise track width **33*a*** that is firmly established relative to the ends of the ferrite blocks in this fabrication technique.

Thereupon, a plurality of elongate rectangular ceramic spacers 34, as best shown in FIG. 5B, are formed for mated insertion into each of the slots 32. In a preferred embodiment, the spacers 34 are formed from FOTOCERAM, a chemically machinable ceramic-convertible glass commercially available from Corning Glass Company. Finally, the ceramic spacers 34 are mated each with a slot 32 and glass bonded to the walls thereof.

Having mounted the various ceramic spacers within the slotted ferrite block 30, a plurality of slots 35 are formed in the block 30 each within the previously bonded ceramic spacers 34. As best seen in FIG. 5C, one such slot 35 is centrally cut in each spacer 34 to a depth less than the depth of the spacer, thereby providing the spacer with a U-shape. This is an important feature of the invention since it assures good support for the fragile pole pieces even after the ceramic spacers are provided with shield slots. In the presently preferred method, this second slotting operation results in the formation of two ceramic spacer arms **34*a* and 34*b* between each pair of ferrite abutments 33. The block assembly is now cut along a plane normal to face 31 as best illustrated in FIG. 5D and at right angles to ceramic spacers 34*a* and 34*b* so as to form two equal, severed half blocks 30*a* and 30*b* having opposing faces 36 and 37. The preceding method is particularly adapted to manufacture of high track density heads — hose heads having densities on the order of 21 tracks or more per inch. Since these heads typically require a ferrite abutment 33 having a width 33*a* of 0.018 inches or even less, the ferrite block 30 will have many thin and fragile ferrite fingers that are susceptible to frequent damage during manufacture. During the present method, the exposure to handling damage is minimized; before the second slotting operating the ferrite track width abutments 33 are firmly supported by the bonded ceramic spacers 34. In this manner the brittle ferrite material is protected during the subsequent grinding of the ferrite shield slots 35 and the cutting of the block 30 into two half-blocks 30*a* and 30*b*. The delicate ferrite side walls of abutments 33** are never exposed unsupported to machining operations after their initial formation.

With reference now to FIG. 5E, the block portion **30*a* alone is provided with a bevelled face 44 cut at approximately 60° along a longitudinal edge of the severed half-block 30*a* intercepting each ferrite abutment 33 and ceramic spacers 34*a* and 34*b* as illustrated to leave a strip portion of the original planar face 36 as a surface 36*a*. Slots 38*a* and 38*b* are further provided in the ferrite half-blocks 30*a* and 30*b* in order to reduce the gapping surface areas (making it easier to lap these areas flat) and also to accept meltable glass rods for additionally bonding the blocks 30*a* and 30*b*. The half-blocks 30*a* and 30*b* are now lapped along face 37 and surface 36*a*** to insure proper alignment of the ferrite abutments carried by each block when they are mounted together as described herein.

Having completed these steps, one or both of the surfaces **36*a* and 37 of the half-blocks 30*a* and 30*b* are disposed to receive a deposited layer of non-magnetic gap forming material, such as layer 39**. This layer may be provided by a number of known processes and materials, such as by sputtering a thin layer of aluminum oxide ($Al_2O_3$) on the respective surfaces of each half-block.

At this point in the assembly, the half-blocks **30*a* and 30*b* are adapted for abutting against each other to establish the gap line. In a significant departure from the prior art, the present embodiment does not require that the half-blocks 30*a* and 30*b* be rotated by 90° about their longitudinal axes in order to meet in registration at their gap defining surface. Instead, the half-blocks 30*a* and 30*b* are merely rejoined in registration separated only by the layer 39. What this means is that the original orientation of the uncut block 30 is maintained throughout assembly. The actual assembly of the half-blocks 30*a* and 30*b* into the final head structure is accomplished by aligning the half-blocks into a pair of ceramic brackets 40*a* and 40*b*. The brackets are provided with a height-wise dimension 41 that so exceeds the corresponding height-wise dimension 42 of the half-blocks 30*a* and 30*b* (refer to FIG. 5E) that a basin — generally shown by 43 in FIG. 5G — is formed when the brackets 40*a* and 40*b*** enclose the half-blocks during assembly.

Figure 5K:
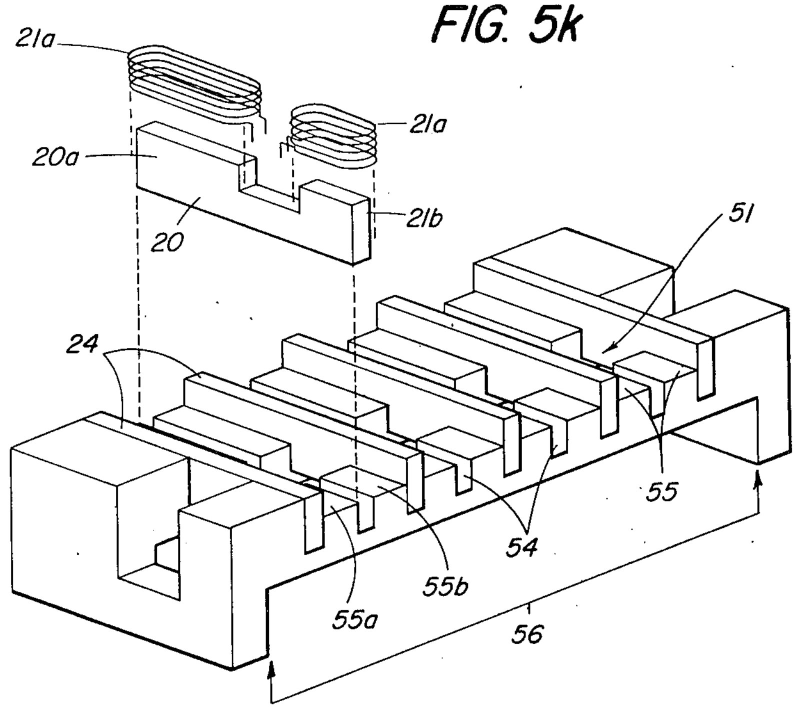
Figure 4:
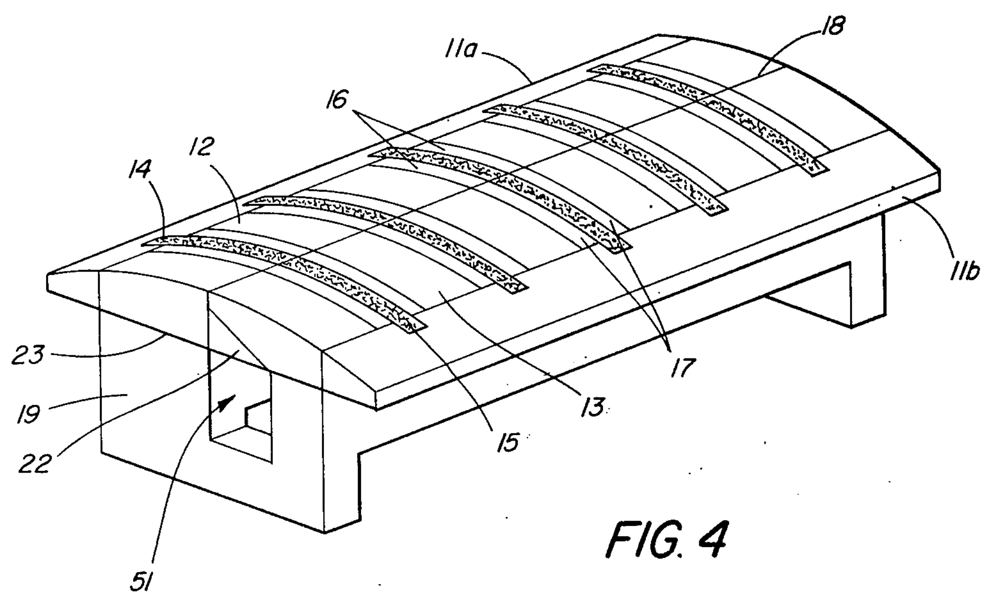
FIG. 4 is a perspective view of the magnetic head assembly.
Figure 5F:
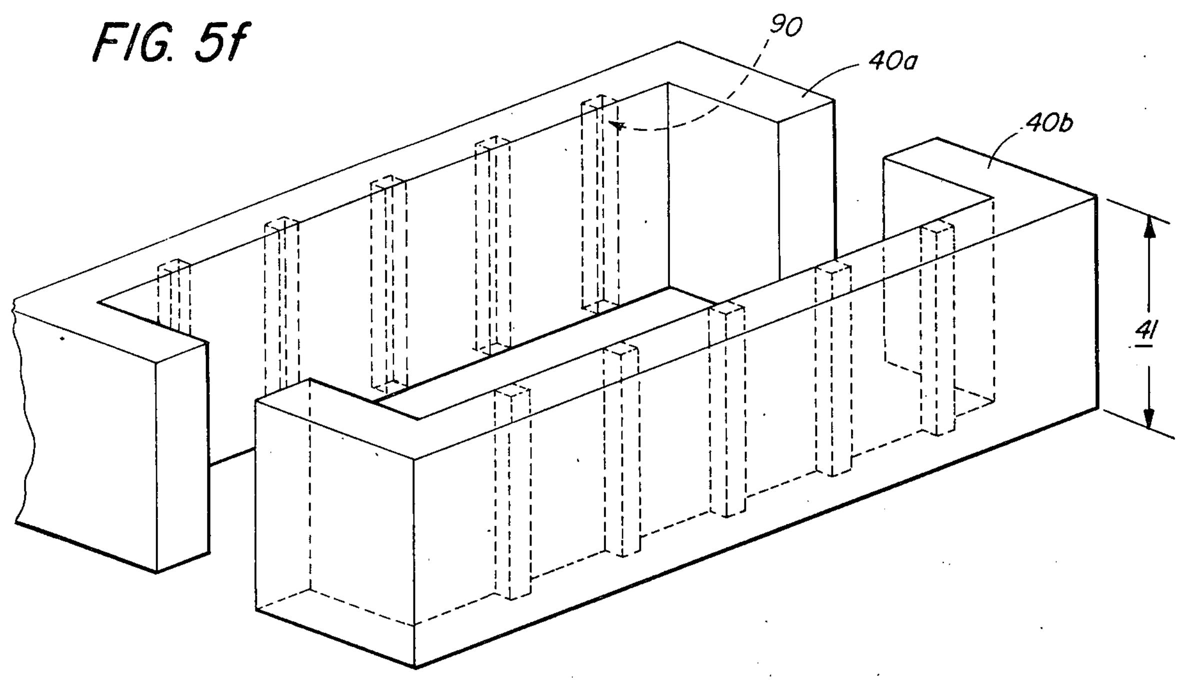
Figure 5G:
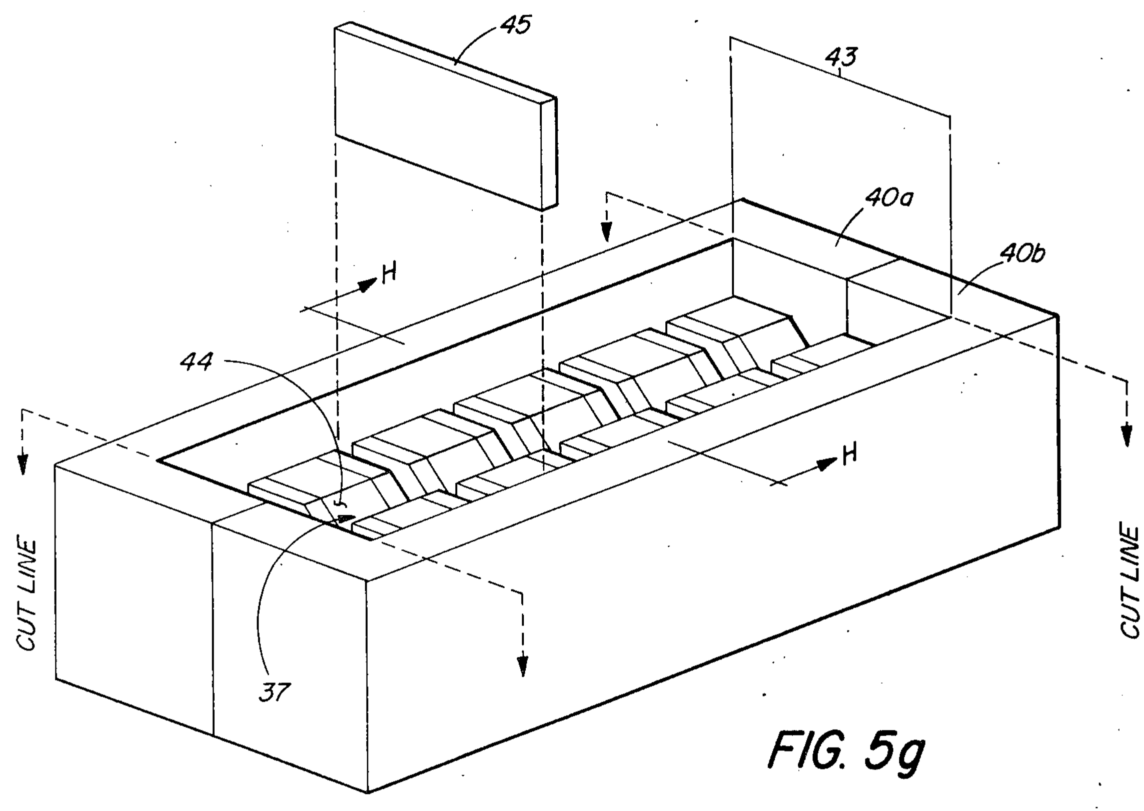

The assembly of the half-blocks **30*a* and 30*b* is best shown in FIG. 5G where the parts have been enclosed by the brackets 40*a* and 40*b*, which together form the surround 10. The brackets 40*a* and 40*b* are so formed that when they are precisely abutted with the ferrite-ceramic half-blocks in between, the areas 37 and 36*a* of the half-blocks are automatically located substantially coextensive — with the respective portions of the ferrite abutments 33 and the ceramic spacers 34*a* and 34*b*** opposite each other.

Half-blocks **30*a* and 30*b* are further secured together in their assembled relation by a plurality of ferrite shields — one of which is shown as shield 45 in FIG. 5G — which extend into the slots 35 across the gap line. It is to be noted that, because the shields are inserted after the half-blocks are cradled by the brackets 40*a* and 40*b*, the shields do not get gapped. Further, the brackets, preferably, are themselves slotted (see dotted slots 90 of FIG. 5F) to accept extra wide shields. This not only provides a better magnetic shielding between the cores, but provides additional strength for the head. See FIG. 5I. Bonding glass is placed in the basin 43 formed by the mating of the ceramic brackets 40*a* and 40*b* and, in a second glass bonding operation, the half-blocks 30*a* and 30*b* are bonded into the ceramic brackets and the ferrite shields 45 are bonded into the slots 35. With the bonding glass contained and flowing within the basin 43, a portion of the glass accumulates in the wedge-shaped groove 22 and firmly joins the two half-blocks together below the transducing gap. As best shown by FIG. 5H, the parts assembled thus far have a cross section (taken at H—H in FIG. 5G) which, after precontouring, will be described by the broken line 46 in FIG. 5H wherein the remaining gap line 47 becomes the transducer gap of the finished transducer. It is thus seen that the ceramic brackets 40*a* and 40*b*** — essentially functioning as a workpiece during head assembly — are partly consumed during precontouring and partly retained as an integral portion of the head face.

The assembly resulting from these method steps is illustrated in FIG. 5I and will henceforth be identified, in accordance with FIGS. 1–4, as face 11 consisting of two half portions **11*a* and 11*b*. Similarly, ferrite abutments 33 now become pole pieces 12 and 13, ceramic spacers 34 become spacers 16 and 17, and ferrite shield 45 becomes shield 14. The structure of FIG. 5I** is characterized by the glass forming the bonds at A through K, etc. being integral, and in the form of a lattice.

With reference to FIG. 5J, a back housing 19 is formed from a ceramic block 50 that is provided with a longitudinal channel 51 and narrower transverse slots 52 that descend in the block 50 to a depth less than the depth of the longitudinal slot 51. In a preferred embodiment the block 50 is formed of forsterite, or similar ceramic. The slots 52 are located in positions corresponding to the planar exposure of shields 15 along planar surface 25 of face 11. Then the plurality of back shield members 24 are glass bonded into the plurality of slots 52. The resultant structure is slotted in a two step grinding operation best illustrated by FIG. 5K. First a deeper slot 54 is cut into the ceramic material remaining between each back shield 24. This slot provides space for the u-shaped back core 20 that is formed for mated insertion into the portion of slot 54 remaining after the second grinding operation. In the second step of the grinding operation, all the remaining ceramic material between each back shield 24 is shallowly removed, leaving a new slot 55 and a portion of the slot 54 remaining at the bottom thereof. Next the aforementioned back core 20 is bonded into the remaining portion of the slot 54. It is noted that the separate branches 20*a* and 20*b* of the core member 20 extend above the bottom edge of the slots 55 thereby forming shoulders 55*a* and 55*b*. The pair of coils 21*a* and 21*b* are inserted over the branch members 20*a* and 20*b* respectively and rest upon the shoulders 55*a* and 55*b*.

An elongate slot 56 is provided through the bottom of back housing 19 such that it intersects the channel 51 precut into the ceramic block 50. With the channel 51 partially cut-away, the interior of the slots 54 are exposed to the bottom of the back housing 19 through the now-open channel 51. The leads from the coils 21*a* and 21*b* are directed through the slots 51 and out the open channel 56 to suitable connectors (not shown) on a rear housing terminal board. Prior to assembling the final head structure, the mating surfaces of the block 50, the back shields 24 and the branch members 20*a* and 20*b* are polished to a common planar surface. Then a surface of the face 11, and identified by the bracket 57 in FIG. 5H, is correspondingly polished. Finally, the face 11 is mounted on the back housing 19 with various pole pieces 12 and 13, and shields 14, in registration with core members 20 and back shields 24. With all parts in proper registration, each is secured to another by an epoxy bond as mentioned in connection with FIG. 3. This feature permits subsequent removal of face 11, should it prove initially defective or thereafter become defective in operation, merely by grinding away the face part until the surface 26 of back housing 19 is reached. Thereupon surface 26 may be relapped and a new face 11 installed.

The invention has been described in detail with particular reference to preferred embodiments thereof, but it will be understood that variations and modifications can be effected within the spirit and scope of the invention.

What is claimed is:

1. In the method of forming the front face of a multitrack magnetic head, the steps of:

(a) cutting a number of widthwise slots into a bar of ferrite, (b) bonding ceramic pieces in said slots, (c) slotting through said ceramic pieces, (d) longitudinally cutting said bar through said ceramic pieces, thereby to form bar pieces, (e) placing gap defining non-magnetic means along at least one of the opposing surfaces resulting from the cutting of said bar of ferrite, (f) chamfering at least one of said bar pieces to define a depth for said gap defining means, (g) placing said bar pieces within a ceramic surround that has a depth greater than the depth of said bar, (h) placing magnetic shields within the slotted ceramic pieces, (i) placing glass over the bar pieces and within said surround, and (j) heating said surround with its contents to cause said glass to melt and create a unitary lattice of glass filling the chamfer and bonding all parts, including the surround, together.

2. The method of claim 1 wherein the slotting through said ceramic pieces is such that said pieces become generally U-shaped in cross section.

3. In the method of forming the front face of a multitrack magnetic head, the steps of:

(a) cutting a number of widthwise slots into a bar of ferrite, (b) bonding ceramic pieces in said slots, (c) slotting through said ceramic pieces, (d) longitudinally halving said bar, (e) placing gap defining non-magnetic means along at least one of the opposing surfaces resulting from the halving of said bar of ferrite, (f) chamfering at least one of said bar halves to define a depth for said gap defining means, (g) placing the bar halves within a ceramic surround that has a depth greater than the depth of said bar, and which surround has slots that align with the slots in said ceramic pieces, (h) placing magnetic shields within said slotted ceramic pieces, said shields extending into the slots of said surround, (i) placing glass over the bar halves within said surround, and (j) heating said surround with its contents to cause said glass to melt and create a unitary lattice of glass filling the chamfer and bonding all parts, including the surround, together.

4. The method of claim 3 wherein the slotting through said ceramic pieces is such that said pieces become generally U-shaped in cross section.

* * * * *